United States Patent [19]

Kirchweger

[11] Patent Number: 4,562,895
[45] Date of Patent: Jan. 7, 1986

[54] MOTOR VEHICLE ENGINE COOLING ARRANGEMENT

[75] Inventor: Karl Kirchweger, Graz, Austria

[73] Assignee: AVL Gesellschaft fur Verbrennungskraftmaschinen und Messtechnik, Graz, Austria

[21] Appl. No.: 597,420

[22] Filed: Apr. 6, 1984

[30] Foreign Application Priority Data

Apr. 8, 1983 [AT] Austria .................. 1266/83

[51] Int. Cl.$^4$ .............................................. B60K 11/00
[52] U.S. Cl. ................. 180/68.1; 123/198 E; 180/69.22; 181/204; 181/256
[58] Field of Search ............ 180/68.1, 68.2, 68.3, 180/69.22, 68.4, 68.6; 181/204, 228, 240, 252, 256; 123/41.1, 198 E

[56] References Cited

U.S. PATENT DOCUMENTS

| | | | |
|---|---|---|---|
| 1,334,811 | 5/1919 | Smith | 180/68.4 |
| 1,622,498 | 3/1927 | Dunn | 180/68.2 |
| 2,913,665 | 11/1959 | Lyon | 180/68.6 |
| 3,961,605 | 6/1976 | Kaltner | 180/68.1 |
| 4,086,976 | 5/1978 | Holm et al. | 180/68.1 |
| 4,114,714 | 9/1978 | Fachbach et al. | 180/69.22 |
| 4,164,262 | 8/1979 | Skatsche | 180/68.1 |
| 4,194,484 | 3/1980 | Kirchweger et al. | 181/204 |
| 4,203,407 | 5/1980 | Fachbach et al. | 181/204 |
| 4,388,804 | 6/1983 | Bushmeyer | 180/68.1 |
| 4,455,971 | 6/1984 | Kirchweger | 123/41.7 |

Primary Examiner—Joseph F. Peters, Jr.
Assistant Examiner—Everett G. Diederiks, Jr.
Attorney, Agent, or Firm—Watson, Cole, Grindle & Watson

[57] ABSTRACT

An internal combustion engine powering a motor vehicle is provided with a separate exhaust casing which is located within an engine compartment developed into a sound-insulating capsule, and is designed as a roof-type cover without a bottom shielding at least those parts of the exhaust system close to the cylinder head of the engine. This cover is connected with an outlet opening in an outer wall of the vehicle, which opening is positioned in an area where the heated air rises from the exhaust system, such that ventilation of the capsule and the exhaust system is ensured even after the engine has been turned off.

3 Claims, 8 Drawing Figures

MOTOR VEHICLE ENGINE COOLING ARRANGEMENT

BACKGROUND OF THE INVENTION

This invention relates to a motor vehicle which is powered by an internal combustion engine mounted in an engine compartment. The latter is provided with additional encapsulating elements sealed against parts of the frame and body of the vehicle, to form a sound-insulating capsule comprising sound-absorbing inlet and outlet openings for ventilation of the capsule. At least one of these openings is located in the area where the heated air rises from the exhaust system of the engine, and cooperates with a separate exhaust casing mounted within the capsule.

Today, internal combustion engines—especially those powering motor vehicles used on public motorways—must meet ever more stringent demands concerning the maximum permissible sound radiation. Conventional sound-proofing techniques range from the partial coating with sound-insulating materials and the de-coupling of individual non-power-transmitting components from the basic structure of the combustion engine carrying structure-borne sound, to the use of complete capsules enclosing the combustion engine and even some auxilliary assemblies, thus reducing the radiation of sound from the internal combustion engine.

Since a comparatively large amount of heat is generated by an internal combustion engine in operation, such closed capsules—even if they contain a water-cooled engine—should only be used if the space remaining between the surface of the engine and the wall of the capsule is properly ventilated in order to prevent delicate components, e.g., the dynamo, from overheating. Although it would basically be possible to locate such components outside of the capsule, this would cause problems regarding the power transmission to these components or the penetration of the necessary leads and ducts through the capsule.

In this context special attention must be paid to the exhaust system of the combustion engine, which is not only a source of extreme noise—at least in the vicinity of the cylinder head—but is also one of the hottest parts of the engine, reaching temperatures which necessitiate that the air heated by the exhaust system must be able to flow out of the capsule even after the engine has been turned off. This may be achieved in several ways, as described below.

DESCRIPTION OF THE PRIOR ART

In U.S. Pat. No. 4,203,407, for example, an encapsulated internal combustion engine is described, carrying a separate sound-insulating casing or "sub-capsule" on top of the engine capsule at the side of the exhaust system, which casing is connected with the interior of the capsule enclosing the engine via ring-shaped gaps around the individual arms of the exhaust manifold. During operation of the engine these ring-shaped gaps are used for the passage of cooling air which is fed into the exhaust casing by a special blower provided for ventilation of the capsule. The cooling air leaves the jacket via an absorption muffler around the manifold leading out of the engine. The heated air arising from the hot parts of the exhaust system after the engine has been turned off, can flow off at the upper side of the exhaust casing either via absorption mufflers or a system of flaps to be operated upon turning off the engine. Such a system requires a considerable amount of space, and is difficult to design; it is therefore ill-suited for use in the internal combustion engine of a motor vehicle.

U.S. Pat. No. 4,455,971 discloses and arrangement of an internal combustion engine powering a motor car, which is enclosed by a sound-insulating capsule partially complemented by components of the vehicle itself, and contains a separate exhaust casing within this capsule, which casing is also closed and is directly attached to the cylinder head of the engine. Since the intake end of this casing is usually located at a point higher up than its outlet end—in accordance with today's vehicle design principles—the cooling air will flow through the casing in a top-down direction when the engine, and thus the blower, is in operation.

As soon as the blower has been turned off the hot air tends to reverse its flow-direction, however, and will escape from the exhaust casing whenever possible, thus overheating the interior of the capsule.

For this reason the inlet openings for the cooling air should not be placed at the topmost positions in order to avoid wakes in the flow of cooling air, and the closed exhaust casing must be perfectly sealed against the interior of the sound-insulating capsule, which, apart from the efforts involved in the design of such a casing which must fit around the exhaust system rather tightly, will affect both assembly and maintenance. This will apply in particular if exhaust turbochargers or devices for exhaust gas recycling are included, as is often the case in modern high-performance combustion engines.

SUMMARY OF THE INVENTION

It is an object of the present invention to avoid the mentioned disadvantages of the above types of motor vehicles, especially with regard to the complex design of the exhaust casing, and to improve such vehicles in a manner characterized by its simplicity of design and ease of assembly and maintenance, which will ensure cooling and ventilation of the capsule and of the exhaust system of the combustion engine both while the engine is operating and after it has been turned off.

According to the invention this object is achieved in a motor vehicle of the abovementioned type by designing the exhaust casing as a roof-type cover without a bottom, shielding at least those parts of the exhaust system close to the cylinder head, and by positioning the corresponding outlet opening in an outer wall of the vehicle. In this way the hot air which is generated by the running engine and by the hot exhaust system even after the engine has been turned off, and which rises naturally within the capsule, will directly enter the roof-like cover shielding at least those parts of the exhaust system close to the cylinder head, and will directly flow out through a sound-insulated outlet opening in an outer wall of the vehicle. If the capsule is force-ventilated—for instance by a separate blower powered by the combustion engine—part of the cooling air of the capsule will flow off through the outlet opening of the exhaust casing, improving the overall cooling of the exhaust system during operation of the engine. If no forced ventilation is provided for the capsule, or if the supply of cooling air to the capsule is solely based on utilizing the dynamic pressure generated by the moving vehicle, the air rising along the hot exhaust system and flowing out through the outlet opening may also be used for feeding fresh cooling air into the capsule via a sound-insulated inlet opening to be placed wherever desirable.

In an enhanced variant of the invention the outlet opening cooperating with the casing of the exhaust system may be placed in an area of the outer wall where a partial vacuum develops when the vehicle is moving, which will improve the removal of air heated at the exhaust system from the area of the exhaust casing or from the interior of the capsule in general.

According to another favorable variant of the invention the casing is attached to the combustion engine, or rather its exhaust system, and is provided with an outlet fitting which opens into an absorption muffler without touching it, leaving open an essentially ring-shaped gap, the muffler being located at the outer wall of the vehicle, preferably at the hinged engine bonnet, and leading to the outlet opening. This simple method will ensure that the exhaust casing which also tends to heat up during operation, cannot give off heat or structureborne sound to the outer wall of the vehicle, in addition to offering better access to the engine and the exhaust system itself—especially if the absorption muffler is mounted on the hinged bonnet.

DESCRIPTION OF THE DRAWING

The following is a more detailed description of the present invention, as illustrated by the enclosed drawings in which.

DESCRIPTION OF THE PREFERRED EMBODIMENTS

Figure 1:
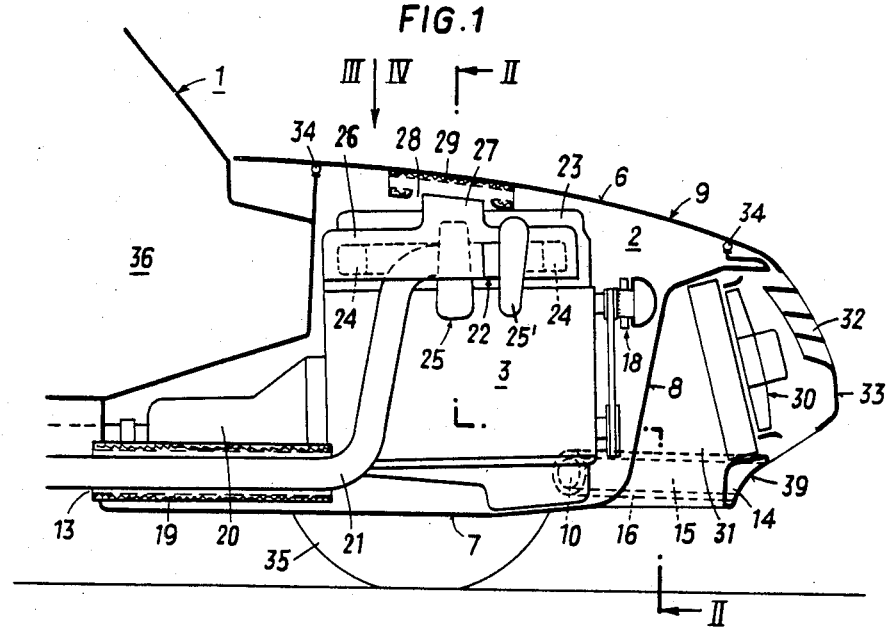
FIG. 1 shows a partial vertical section through a motor vehicle according to the invention, in a schematic representation.
Figure 2:
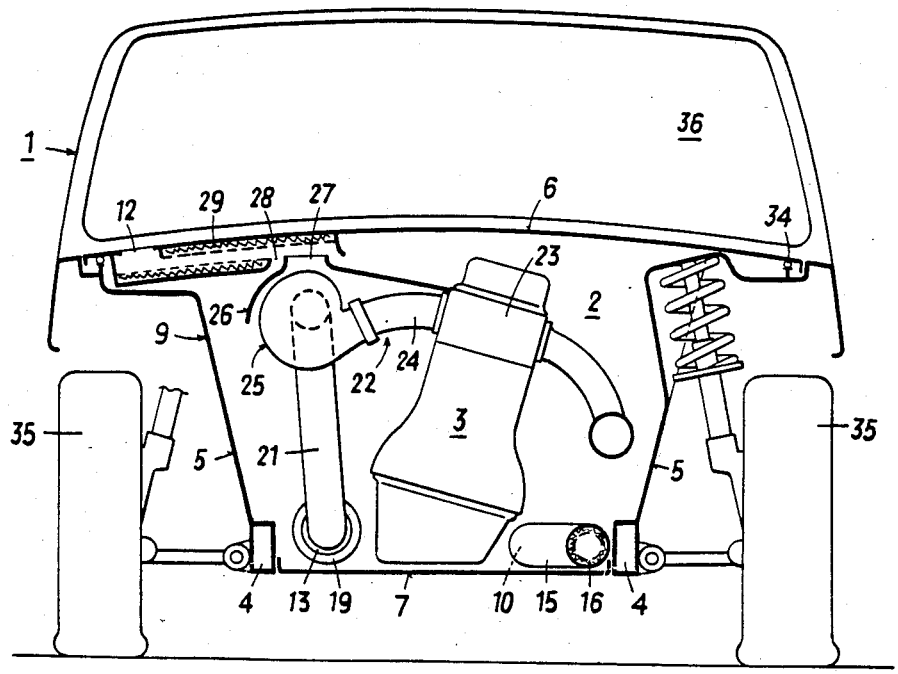
FIG. 2 presents a partial section along line II—II in FIG. 1.
Figure 3:
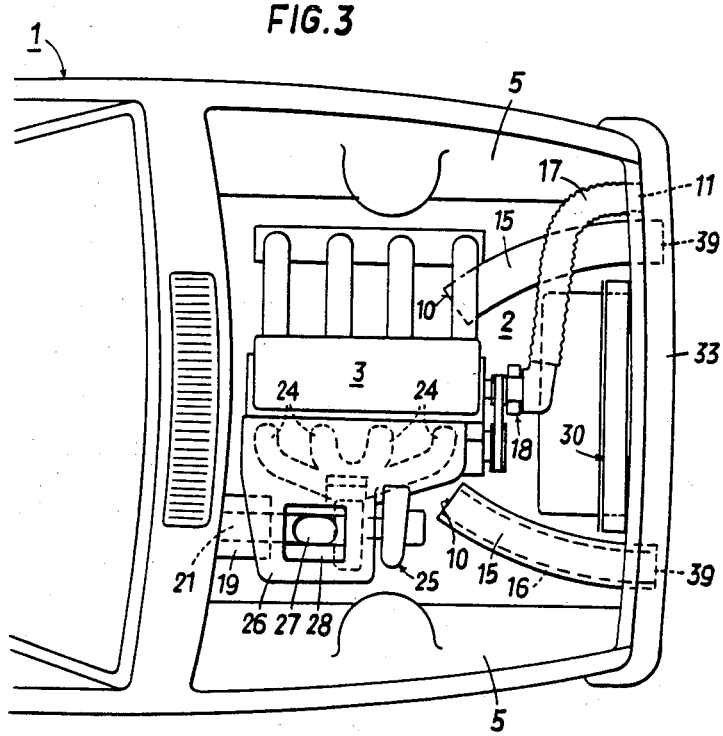
FIG. 3 presents a view along arrow III in FIG. 1, with the engine bonnet removed.
Figure 4:
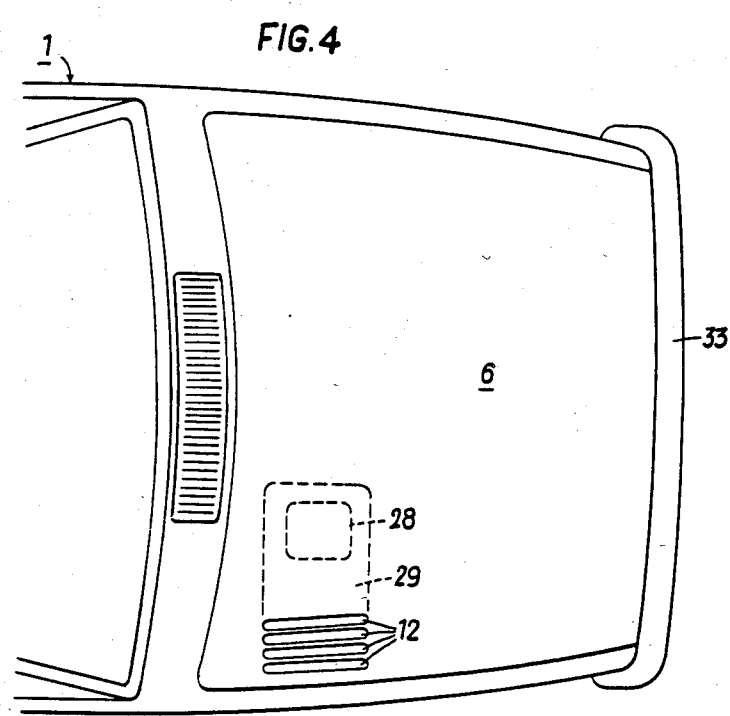
FIG. 4 presents a view corresponding to that of FIG. 3, with the engine bonnet closed.

A motor vehicle 1 presented in FIGS. 1 to 4 is conceived as a passenger car, and is powered by an internal combustion engine 3 which is mounted in an engine compartment 2 at the front of the car. The engine compartment 2 is completed by additional encapsulating elements, such as bottom 7 and front baffle plate 8, which are sealed against such parts of the frame or body as, e.g., longitudinal subframe beams 4, wheelguard covers 5 or engine bonnet 6, to form an enclosed sound-insulating capsule 9. The capsule 9 has inlet openings 10, 11 and outlet openings 12, 13, which are insulated in order to prevent the escape of air-borne sound, and are used for ventilation of the capsule.

In the variant shown here the inlet openings 10 are located at an end opening into the capsule interior of two curved ducts 15 originating at a front cross-member 14 of the vehicle 1, the other end of these ducts at the side of the cross-member being exposed to the dynamic pressure generated by the vehicle in motion. A sound-absorbing lining 16 will prevent the escape of air-borne sound from the capsule, the curved shape of the ducts 15 impeding the direct escape of noise. In this variant the inlet opening 11 which is also located at a point at the front of the motor vehicle 1 where it is subject to the dynamic pressure generated by the vehicle, is connected via a flexible hose 17 with a blower 18 directly powered by the internal combustion engine 3, which will supply the capsule with a sufficient amount of cooling air, even if the vehicle is at a standstill while the engine is running.

The outlet opening 13 is designed as a ring-shaped gap provided with an absorption muffler 19 and running around the exhaust pipe 21 leading out of the capsule 9 in the vicinity of the gearbox 20, such that the exhaust pipe 21 penetrates the capsule without touching it. In the area where the heated air rises from the exhaust system 22 of the combustion engine 3—which in this variant includes an exhaust turbocharger 25 in addition to the manifold 24 flange-mounted to the cylinder head 23, and the exhaust pipe 21—a cover 26 without a bottom is provided as a separate exhaust casing offering a roof-like shield at least to the parts of the exhaust system 22 next to the cylinder head, which cover is attached to the combustion engine 3, or rather to the exhaust system 22 in a manner not shown. This cover 26 has an outlet fitting 27 which opens without any direct contact into an absorption muffler 29 located at the hinged engine bonnet 6, leaving open an essentially ring-shaped gap 28. The absorption muffler 29 is connected with the outlet opening 12 which, as in the variant shown here, may be situated in an area where a partial vacuum develops when the vehicle is in motion; this will create a suction effect via the outlet opening 12 and the absorption muffler 29 attached to it.

Other parts of the motor vehicle, such as a radiator fan assembly 30 at the front end of the vehicle, an air duct 31, radiator grille 32, bumper 33, gasket 34 of the engine bonnet, wheels 35 including their suspension, car interior 36, etc., are mentioned here for the sake of completeness only.

If the vehicle 1 is at a standstill, the engine compartment 2 or the interior of the sound-insulating capsule 9 is ventilated by blower 18 which takes in air through the inlet opening 11 and delivers it into the open via the outlet openings 12, 13. To a certain degree the air rising from the heated exhaust system 22 and flowing into the open through the outlet opening 12 also contributes towards a better ventilation. If the vehicle is in motion the dynamic pressure present at the front intake openings of the ducts 15 provides for additional ventilation by feeding air into the capsule via the inlet openings 10 which may be located in the vicinity of any parts of the combustion engine requiring special cooling, e.g., the oil sump, the fuel pump, or the dynamo. Furthermore, positioning the outlet opening 12 in an area of the outer wall where a partial vacuum develops when the car is in motion, will produce a kind of suction effect which also serves to improve ventilation of the capsule.

These simple techiques will ensure adequate ventilation of the interior of the sound-insulating capsule, both if the vehicle is at a standstill and if it is in motion, the rooftype cover 26 of the exhaust system being much simpler in design and much more convenient for the purposes of assembly and maintenance than a closed, separate exhaust casing would be.

Deviating from the arrangement discussed before, it would also be possible to do without the blower 18 for ventilation of the capsule, provided that the heated air rising in the cover 26 will guarantee sufficient ventilation even if the vehicle is at a standstill while the engine is running.

It should further be pointed out that components such as the compressor 25' of the turbocharger or control elements of an exhaust gas recycling system not shown here, which must be protected from overheating, must be mounted outside the roof-type cover 26; as the cover does not have a bottom this will present no problem.

Figure 5:
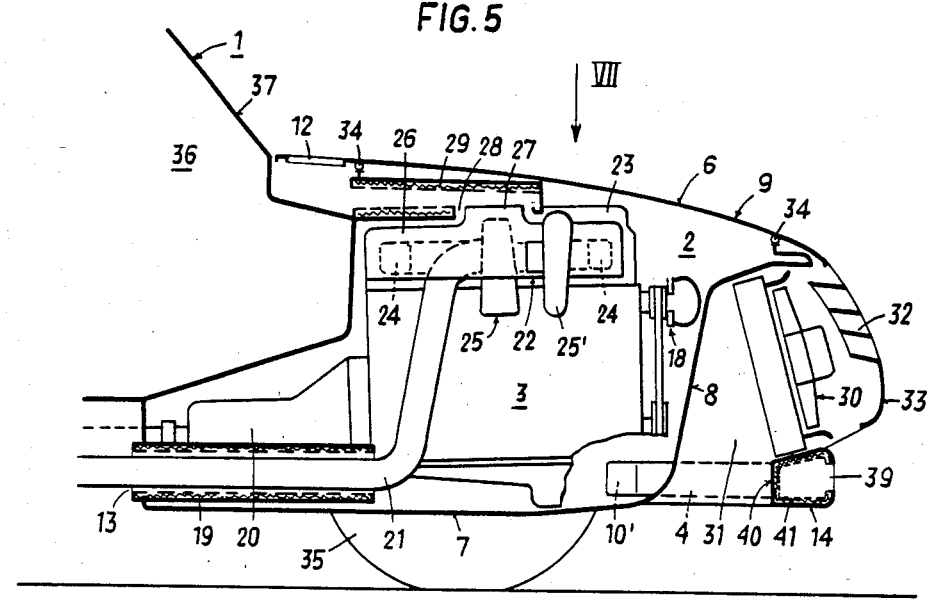
FIG. 5 presents another variant of the invention, the view corresponding to that of FIG. 1.
Figure 6:
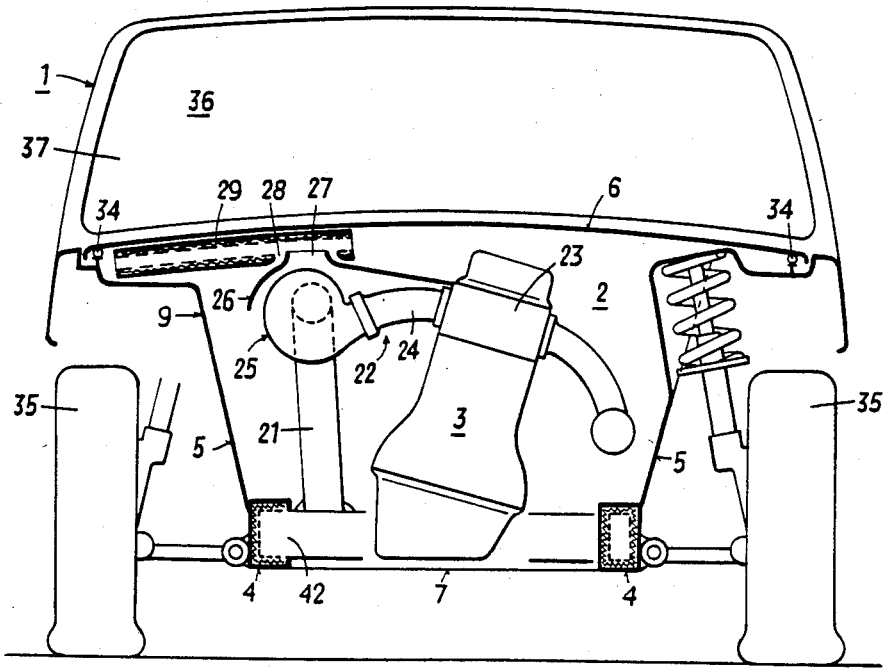
FIG. 6 presents a section corresponding to that of FIG. 2, through the variant according to FIG. 5.
Figure 7:
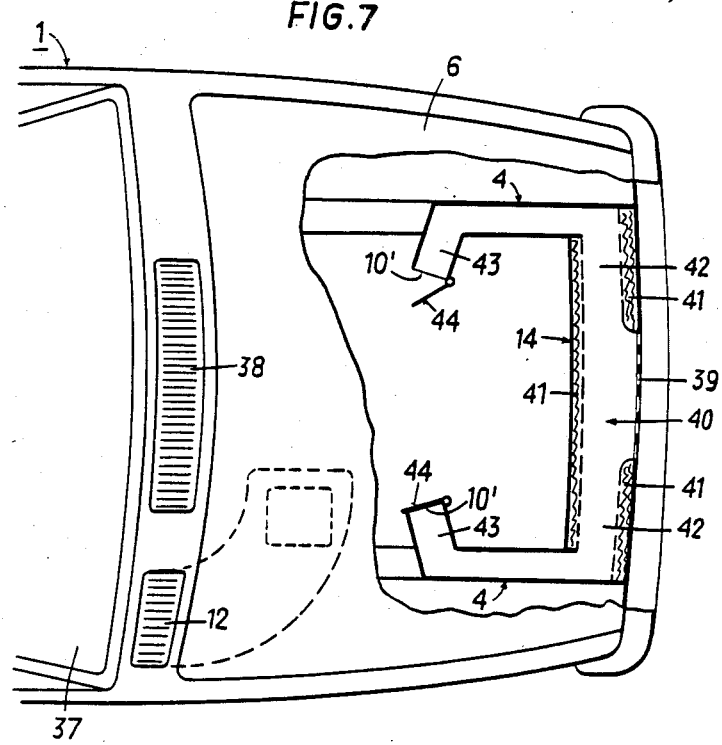
FIG. 7 presents a view along arrow VII in FIG. 5, with the engine omitted.

The variant presented in FIGS. 5 to 7 differs from that in FIGS. 1 to 4 in two respects only:

(a) The outlet opening 12 is not located on the hinged engine bonnet 6 but in the area between the bonnet 6 and the windscreen 37, next to the intake 38 for ventilation of the car interior 36, which only necessitates a different design and manner of fastening of the absorption muffler 29.

(b) The front cross-member 14 is provided here with an intake opening 39 open in the direction of motion, and is configured as a closed intake housing 40. This intake housing 40 is provided with a sound-absorbing lining 41. Besides, the intake housing 40 is connected with the longitudinal subframe beams 4 of the vehicle frame via openings 42, such that these beams 4 will feed cooling air to the inlet openings 10' when the vehicle is in motion, utilizing the dynamic pressure at the intake opening 39. The inlet openings 10' are located on fittings 43 issuing from the beams 4, and are provided with spring-loaded flaps 44, as shown in FIG. 7. The flaps 44 will prevent the escape of cooling air from the capsule via the feed openings 10', which otherwise would be possible if the dynamic pressure was lower than that prevailing inside the capsule.

For a discussion of any other details refer to the description of FIGS. 1 to 4; identical parts have identical reference numbers. For clarity's sake the combustion engine itself is left out in FIG. 7.

Figure 8:
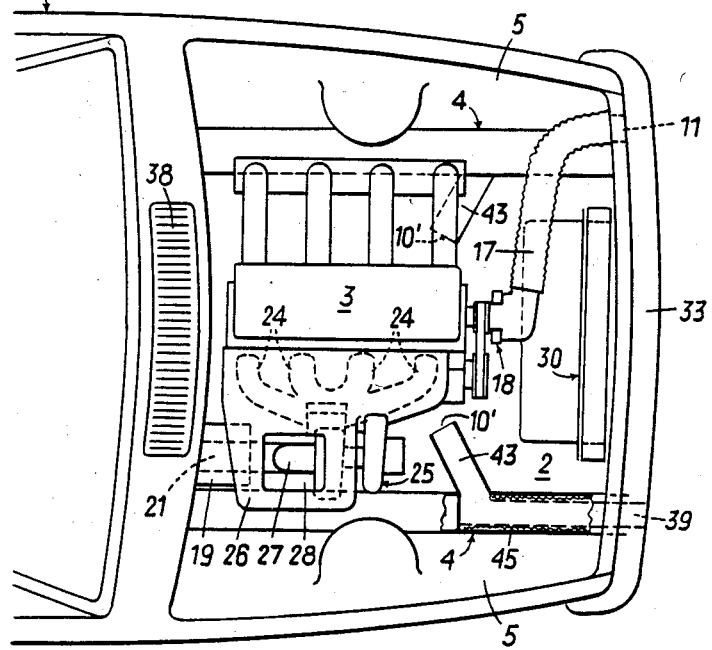
FIG. 8, presents a view corresponding to that of FIG. 7 (with the bonnet removed) of yet another variant of the invention.

The variant according to FIG. 8 essentially is a combination of the two variants discussed before. The cover 26 of the exhaust system and the location of the corresponding outlet opening (not shown here) are the same as in the variant shown in FIGS. 1 to 4; the feed of cooling air to the capsule via the longitudinal subframe beams 4, or rather the fittings 43 issuing from the beams 4, into the inlet openings 10', which is supported by the prevailing dynamic pressure, corresponds to that of the variant presented in FIGS. 5 to 7, although the variant of FIG. 8 does not include separate back valves at the inlet openings 10'.

Another deviation from FIG. 7 is that the beams 4 in FIG. 8 have a sound-absorbing lining 45 which may be provided either in addition to the sound-insulated intake housing 40 (FIG. 7) or instead of it.

For any other details the same applies as above; identical parts again are given identical reference numbers.

I claim:

1. A motor vehicle, comprising a frame and a body, outer walls, an engine compartment, an internal combustion engine mounted in said compartment to power the vehicle and having a cylinder head and an exhaust system at a predetermined elevation connected thereto, encapsulating elements sealed against parts of said frame and said body to form a completely enclosed sound-insulating capsule for said engine compartment, said capsule including sound-absorbing inlet and outlet openings for ventilation of said capsule, one of said outlet openings being disposed at an elevation above said predetermined elevation so as to be located in an area where heated air rises from said exhaust system, a separate exhaust casing mounted wholly within said capsule and having an outlet in open communication with said one of said outlet openings, said exhaust casing comprising a roof-type cover having no bottom, said cover being attached to said engine and shielding at least parts of said exhaust system lying adjacent said cylinder head, said cover having an outlet fitting defining said outlet thereof, an absorption muffler on an outer wall of the vehicle, said outlet fitting opening into said muffler and being out of contact therewith so as to form an essentially ring-shaped gap therewith, and said one of said outlet openings in communication with said exhaust casing outlet being located in one of said outer walls of the vehicle.

2. The motor vehicle according to claim 1, wherein said one of said outlet openings in communication with said exhaust casing outlet is located in an area of said one of said outer walls at which a partial vacuum develops during movement of the vehicle.

3. The motor vehicle according to claim 1, wherein said walls include a hinged engine hood, said muffler being attached to said hood.

* * * * *

UNITED STATES PATENT AND TRADEMARK OFFICE
CERTIFICATE OF CORRECTION

PATENT NO. : 4,562,895
DATED : January 7, 1986
INVENTOR(S) : Karl Kirchweger

It is certified that error appears in the above-identified patent and that said Letters Patent is hereby corrected as shown below:

In the title page, correct the name of the Assignee to

--AVL Gesellschaft für Verbrennungskraftmaschinen und

Messtechnik mbH. Prof.Dr.Dr.h.c. Hans List, Graz, Austria--

Signed and Sealed this

Third Day of June 1986

[SEAL]

Attest:

DONALD J. QUIGG

Attesting Officer

Commissioner of Patents and Trademarks